March 11, 1969  G. A. TINNERMAN  3,431,607
UTILITY CLIP

Filed Feb. 9, 1968

INVENTOR
GEORGE A. TINNERMAN

BY *Rurin B. Gurley*
ATTORNEY

United States Patent Office 3,431,607
Patented Mar. 11, 1969

3,431,607
UTILITY CLIP
George A. Tinnerman, 17864 Beach Road,
Lakewood, Ohio 44107
Filed Feb. 9, 1968, Ser. No. 704,387
U.S. Cl. 24—243
Int. Cl. F16l 3/08
5 Claims

ABSTRACT OF THE DISCLOSURE

A sheet metal clip for securing articles, such as wires, to a flange of a beam is formed of two parallel legs connected by a bight portion with a shank passing through openings in the legs adjacent said bight. The opening in one of the legs and the shank have threaded engagement to advance the shank on rotation. The legs are slotted from their free ends toward the openings, the other of the legs having a portion from the slot bent parallel to the shank and extending through the slot in said one of the legs, the end then being bent transversely into axial alignment with said openings to form an abutment for said shank. The opposite end of the shank is formed to engage an article as a wire or cable.

---

The threaded engagement between the shank and opening may be a thread or groove cutting formation on the periphery of the opening or the shank may be threaded to thread into the opening. The clip may be provided with openings for shanks of different sizes. Article attaching formations are provided for on the bight portion.

Nature and objects of invention

This invention resides in a clip to support articles on the flanges of beams, and provides a clip for this purpose which is easy to apply, secure in its attachment and is simple and inexpensive to manufacture. An especially useful application of a clip of this type is the suspension of utility wires or cables along the flange of a beam, the clip having a bridle ring formation to receive the wires.

The clip here shown may be readily adapted to flanges of different thicknesses, and can support various types of articles. In one form of the invention, the standard bridle ring on a threaded shank may be used with the clip. In another form, a smooth shank is used with a thread or groove cutting opening in one leg of the clip.

Drawings

Description

Figure 1:
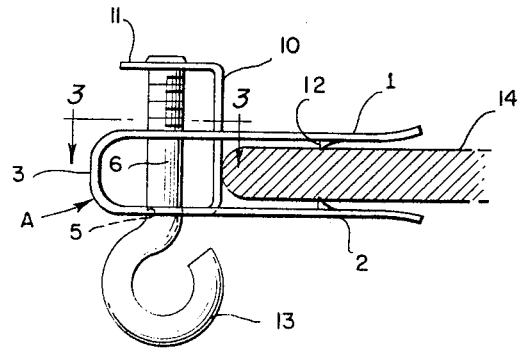
FIGURE 1 shows the clip in side elevation attached to a beam flange.
Figure 2:
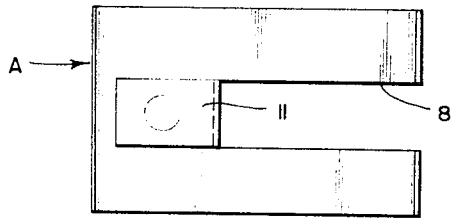
FIGURE 2 is a top plan view of the clip.
Figure 3:
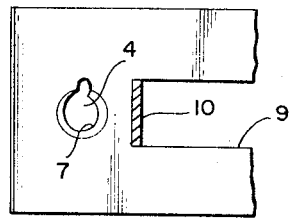
FIGURE 3 is a cross section on line 3—3 of FIGURE 2.

The utility clip A shown in FIGURES 1 to 4 is formed from sheet metal with two legs 1, 2 extending from the bight portion 3. Aligned openings 4, 5 are formed in the legs 1, 2 adjacent the bight portion 3, and a shank 6 passes through opening 5 and has threaded engagement with the periphery of opening 4. In this form, the threaded engagement is provided by a thread or groove cutting rib 7 on the periphery of opening 4, of the type shown and described in copending application Ser. No. 640,213, filed May 22, 1967. Rotation of the shank 6 causes the rib or thread 7 to cut a groove in the shank 6 as the shank is advanced through the openings.

Each of the legs 1, 2 is slotted from its free end toward the opening, as shown at 8, 9. The material from the slot 9 in leg 2 is not severed at the end toward the opening, but is bent to form an arm 10 parallel to shank 6, passing through slot 8 in leg 1, and the end is bent transversely into alignment with openings 4, 5. This end 11 provides an abutment for shank 6 and may be stamped for engagement by the shank 6. Legs 1, 2 are provided with teeth 12. The end 13 of the shank 6 is formed to fasten an article supported by the clip, the end 13 in this example being in the shape of a ring to receive wires or a cable.

The clip is applied to the flange 14 of a beam by pressing the legs over the flange and turning the shank 6 to engage the abutment 11 to draw legs 1 and 2 together, clamping the flange 14 between them. When the clip is applied, the arm 11 acts as a stop to limit movement of the legs over the flange, and thus positions the clip without interfering with the shank, and allowing proper leverage on leg 2 spaced from the bight portion 3.

Figure 4:
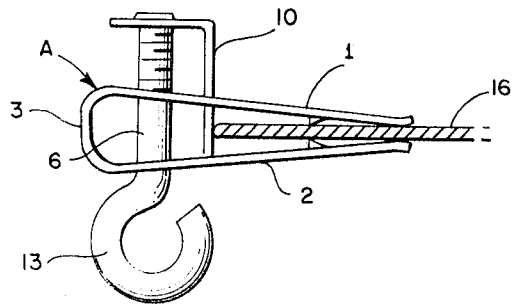
FIGURE 4 is a view similar to FIGURE 1 illustrating the clip secured to a flange of less thickness.

As shown in FIGURE 4, this clip is adjustable to flanges of various thicknesses. The flange 16 is shown as substantially thinner than flange 14 in FIGURE 1.

Figure 5:
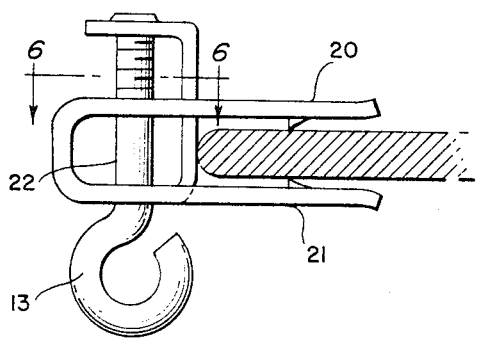
FIGURE 5 is a side elevation of a modified form of the clip attached to a flange.
Figure 6:
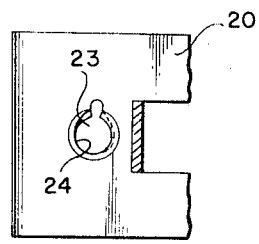
FIGURE 6 is a cross section on line 6—6 of FIGURE 5.
Figure 7:
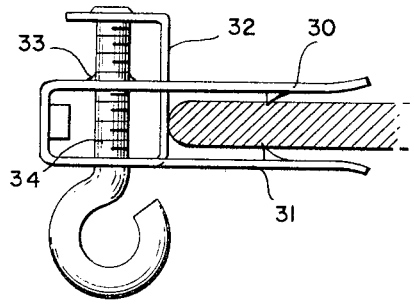
FIGURE 7 is a side elevation of another form of clip with a threaded shank.
Figure 8:
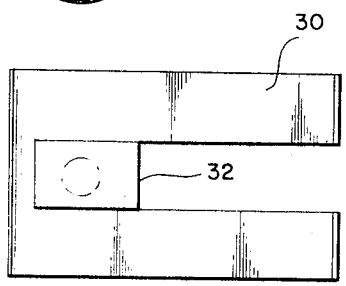
FIGURE 8 is a top plan view of the clip of FIGURE 7.
Figure 9:
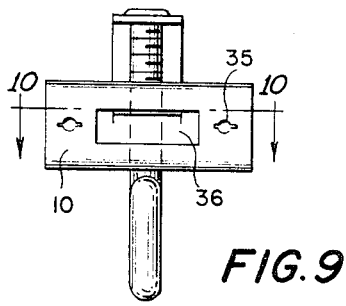
FIGURE 9 is a view in end elevation of the clip of FIGURE 7.
Figure 10:
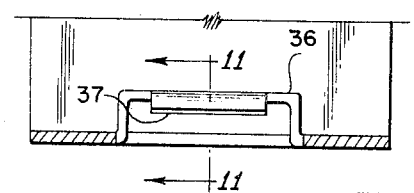
FIGURE 10 is a fragmentary cross section on line 10—10 of FIGURE 9.

The clip may be formed of heavier material as shown in FIGURE 5. Here the legs 20, 21 are substantially heavier and require a greater force to be exerted by the shank 22. With the thicker material, two thread cutting ribs 24 may be formed on the periphery of opening 23, one being punched from each side as described in the above application Ser. No. 640,213.

A clip of this type may be formed to receive a standard bridle ring with threaded shank, as shown in FIGURES 7 to 11. In this case, the legs 30 and 31 and abutment arm 32 are formed as in the first modification, but the opening 33 in arm 30 is formed to receive a threaded shank 34.

The bight portion of the clip may also be provided with connections for the support of various articles. These connections, while shown in FIGURES 9 to 11, may be used in any of the forms of the invention. The openings 35 in FIGURE 9 have thread cutting ribs on their peripheries, of the type disclosed in the above application Ser. No. 640,213. The wall of the bight portion is also offset inwardly, as at 36, and the upper edge is cut and bent rearwardly as at 37 to support a rod or the like which may be inserted in the opening 38 in leg 31.

Figure 12:
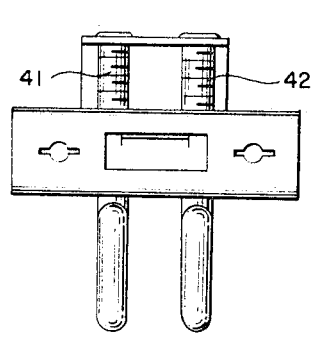
FIGURE 12 is an end elevation of another form of clip.
Figure 11:
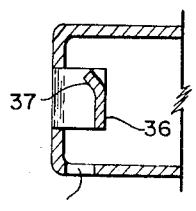
FIGURE 11 is a fragmentary cross section on line 11—11 of FIGURE 10.

To accommodate bridle rings and threaded shanks of different sizes, two sets of aligned openings may be provided in the legs as shown in FIGURE 12. The two threaded shanks 41, 42 may be used, but the clip may be used with only one of the shanks, according to the size available.

The clip shown, in any of its forms, may be quickly applied, is adjustable to flanges of different thicknesses and engages the flange securely. The body of the clip is simply and inexpensively formed from sheet metal, and the shank for actuating the clamp may be either smooth, or may be a standard article with standard threads. While especially adapted to hold utility wires, the same type of clip may be used to support various other articles.

I claim:

1. A utility clip for supporting articles from a flange or the like, comprising a one-piece, U-shaped, metal member having a pair of spaced legs connected by an integral bight portion, there being aligned openings in said legs adjacent said bight portion, a shank passing through said openings and having threaded engagement in the opening in one of said legs to advance said shank in said openings, an integral portion of the other of said legs extending from a point between the opening and the end of said leg past said first leg with an abutment in axial alignment with said openings, so that said shank when threaded through said openings engages said abutment to draw said legs together and clamp a flange between them, said portion acting as a stop to engage the edge of a flange to limit the engagement of the clamp with the flange.

2. A clip as claimed in claim 1, in which the wall of said bight portion has a portion offset inwardly toward said shank, said portion having an upper edge parallel to the planes of said legs bent toward the wall, and there being an opening through the leg below said edge, so that an elongated article may be inserted through said opening and gripped between the wall of said bight and said edge.

3. A utility clip for supporting articles and the like from a flange, comprising a one-piece, U-shaped sheet metal member having a pair of spaced legs connected by an integral bight portion, there being a pair of aligned openings in said legs adjacent said bight portion, a shank extending through said openings, one end of said shank having article supporting means and the other end having threaded engagement in the opening in one of said legs to advance said shank in said openings, said one of said legs having a slot extending from its free end toward the opening, the other leg having a corresponding slot and a tongue formed from said slot extending parallel to said shank through the slot in said one of said legs and transversely into alignment with said openings to provide an abutment for said shank, so that said shank when threaded in said one of said openings draws said legs together to clamp said clip on a flange between said legs, said tongue acting as a stop to limit movement of said clip on said flange.

4. A clip as claimed in claim 3, in which said shank is formed with a bridle ring on one end, and the other end is threaded to thread through the opening in said one of said legs.

5. A utility clip for supporting articles and the like, comprising a one-piece, U-shaped, sheet metal member having a plurality of pairs of aligned openings in said legs adjacent said bight portion, a plurality of shanks of different diameters, each adapted to extend through one pair of openings, one end of each shank having article supporting means and the other end having threaded engagement in the opening in one of said legs to advance said shank in said openings, said one of said legs having a slot extending from its free end toward the openings, the other leg having a corresponding slot and a tongue formed from said slot extending parallel to a shank through the slot in said one of said legs and transversely into alignment with said openings to provide an abutment for said shanks, so that when one of said shanks is threaded in said one of a pair of openings it will engage said abutment and draw said legs together to clamp said clip on a flange between said legs, said tongue acting on a stop to limit movement of said clip on said flange.

References Cited

UNITED STATES PATENTS

| 1,484,307 | 2/1924  | Mazzanovich.  |
| 1,586,939 | 6/1926  | Bement.       |
| 2,062,685 | 12/1936 | Tinnerman.    |
| 2,082,246 | 6/1937  | Hollingsworth.|
| 2,190,463 | 2/1940  | Watt.         |

DONALD A. GRIFFIN, *Primary Examiner.*

U.S. Cl. X.R.

85—36; 248—65